United States Patent [19]
Yamazaki et al.

[11] Patent Number: 5,998,883
[45] Date of Patent: Dec. 7, 1999

[54] WIPER CONTROL DEVICE

[75] Inventors: Haruo Yamazaki; Eisaku Hori; Yasuki Matsumoto, all of Yokohama, Japan

[73] Assignee: Jidosha Denki Kogyo Kabushiki Kaisha, Yokohama, Japan

[21] Appl. No.: 09/127,127

[22] Filed: Jul. 30, 1998

[30] Foreign Application Priority Data

Mar. 19, 1998 [JP] Japan .................................. 10-070815

[51] Int. Cl.$^6$ ................................ B60L 1/00; H02P 1/04
[52] U.S. Cl. .................... 307/10.1; 318/444; 318/DIG. 2
[58] Field of Search ..................... 307/10.1; 318/DIG. 2, 318/443–445

[56] References Cited

U.S. PATENT DOCUMENTS

| | | | |
|---|---|---|---|
| 4,689,535 | 8/1987 | Tsunoda et al. | 318/444 |
| 5,254,916 | 10/1993 | Hopkins | 318/DIG. 2 |
| 5,519,258 | 5/1996 | Stroven et al. | 307/10.1 |
| 5,525,879 | 6/1996 | Wainwright | 318/443 |

Primary Examiner—Jeffrey Gaffin
Assistant Examiner—Roberto Rios
Attorney, Agent, or Firm—Sughrue, Mion, Zinn, Macpeak & Seas, PLLC

[57] ABSTRACT

A wiper control device includes a wiper switch having a variable resistor which is switched to the respective resistance value corresponding to the respective operation mode of the wiper apparatus. An interface circuit is provided with a reference resistor and a capacitor. A microcomputer is provided with a reference charging port for changing the capacitor through the reference resistor, a detective charging port for changing the same capacitor through the variable resistor switched into various resistance values corresponding to the respective operation modes and a reading port for reading as to whether the capacitor is changed up to a predetermined potential level. The microcomputer determines the selected operation mode on the basis of a relative value calculated from the time required for charging the capacitor through the reference resistor by the reference charging port and the time required for charging the capacitor through the variable resistor of the wiper switch by the detective charging port.

7 Claims, 6 Drawing Sheets

WIPER CONTROL DEVICE

BACKGROUND OF THE INVENTION

1. Field of the Invention

This invention relates to a wiper control device for controlling a wiper apparatus for wiping a windshield of a motor vehicle, and more perticalarly to a wiper controller provided with a wiper switch having a variable resistor for selecting operation modes of the wiper apparatus according to corresponding resistance values of the variable resistor.

2. Description of the Prior Art

In a wiper control device in a type of selecting the operation modes of the wiper apparatus according to the resistance values selected through the variable resistor equipped in a mode selection switch of the wiper apparatus among the wiper control devices to control the wiper apparatus for wiping windshields of motor vehicles, there has been known a device having an analog circuit or a device having a microcomputer with an analog-digital conversion function.

However, in the device composed of the analog circuit among the aforementioned wiper control devices, many comparator circuits are required and there is a problem in that the number of elements in the circuit becomes larger and the circuit is very complicated generally. In the device having the microcomputer with the analog-digital conversion function, the number of elements becomes smaller as compared with the device having the analog circuit, but there is another problem in that it is unfavorable in the price to use the microcomputer having the analog-digital conversion function.

SUMMARY OF THE INVENTION

This invention is made in view of the above mentioned problems of the conventional wiper control device, it is an object to provide a wiper control device which is possible to process analog signals through simplified circuit configuration and possible to securely perform selection of the operation modes of the wiper apparatus.

The wiper control device according to this invention is characterized by comprising a wiper switch having a first variable resistor and operable to select one of resistance values of the first variable resistor corresponding to respective operation modes of the wiper apparatus; an interface circuit provided with a capacitor connected with the first variable resistor and a reference resistor connected with the capacitor; and a microcomputer including a reference charging port for supplying a first reference voltage to the capacitor through the reference resistor of the interface circuit, a first detective charging port for supplying a second reference voltage to the capacitor of the interface circuit through the first variable resistor of the wiper switch, a reading port for reading the voltage of the capacitor to be charged up to predetermined electric potential, first means for reading reference charging time required for charging the capacitor up to predetermined electric potential with the first reference voltage supplied from the reference charging port though the reference resistor of the interface circuit and detective charging time required for charging the capacitor up to predetermined electric potential with the second reference voltage supplied from the first detective charging port through the first variable resistor of the wiper switch, and second means for determining the operation mode selected by the wiper switch on basis of relative value calculated from the reference charging time and the detective charging time read by the first means.

In the wiper control device according to this invention, the microcomputer determines the operation mode of the wiper apparatus selected by operating the wiper switch such as a stop mode, intermittent modes with different dwell periods, a low speed mode, a high speed mode, a washer mode, for example on basis of the relative value calculated from the reference charging time required for charging the capacitor up to the predetermined electric potential through the reference resistor in the interface circuit from the reference charging port and the detective charging time required for charging the capacitor up to the predetermined electric potential through the variable resistor in the wiper switch from the detective charging port. Therefore, it is not necessary to use the micro-computer having the analog-digital conversion function. Furthermore, the misjudgement is never caused even if there is fluctuation in the voltage of the power source or the capacity of the capacitor because the operation mode of the wiper apparatus is determined according to the relative value calculated for the reference and the detective charging time required for charging the common capacitor through the different circuits respectively including the reference resistor and the variable resistor having resistance value corresponding to the selected operation mode of the wiper apparatus.

DESCRIPTION OF THE PREFERRED EMBODIMENT

An embodiment of the wiper control device according to this invention will be explained below on basis of FIG. 1 to 6.

Figure 1:
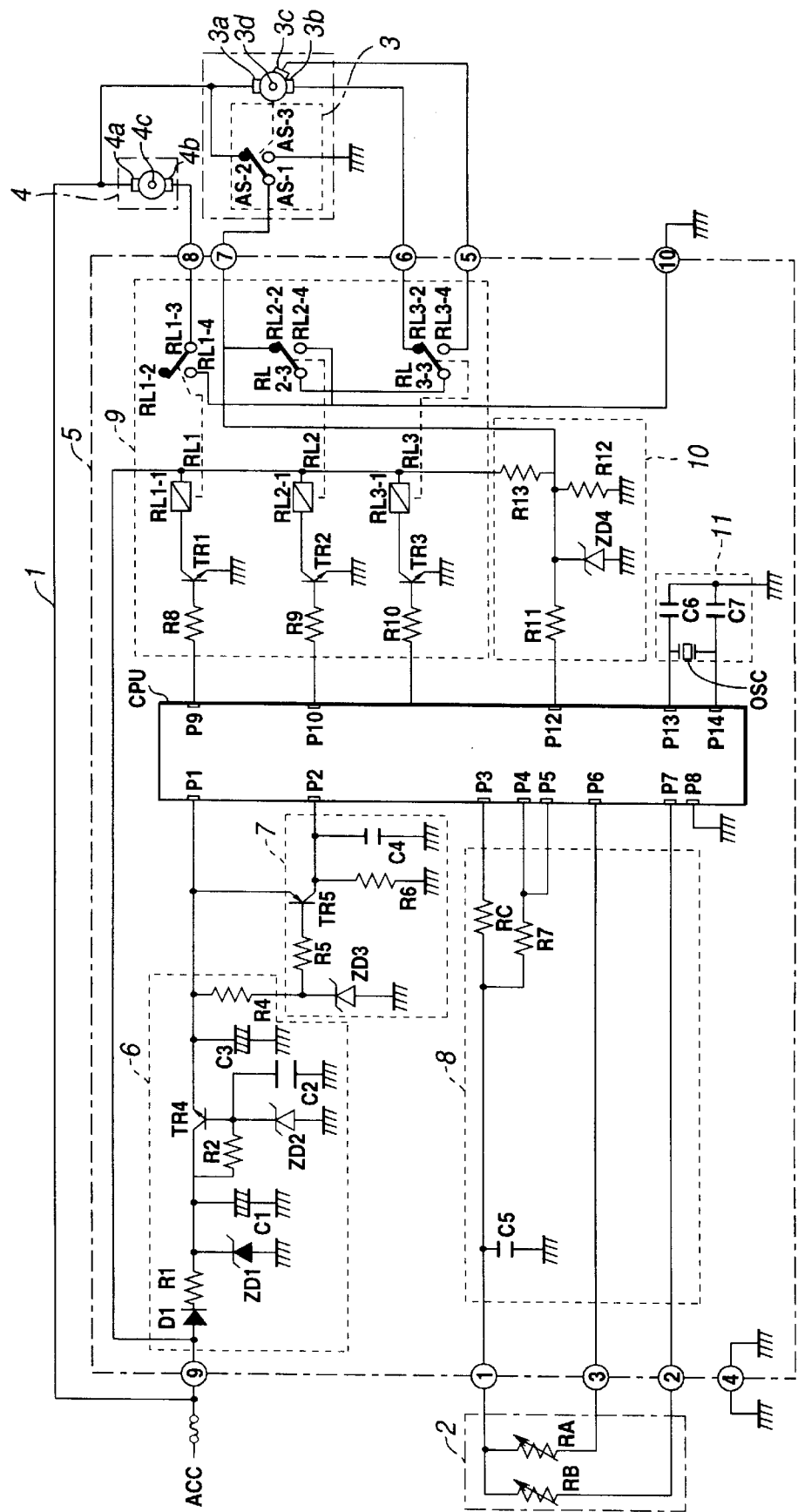
FIG. 1 is a circuit diagram of the wiper control device according to an embodiment of this invention.

A wiper control device 1 shown in FIG. 1 is mainly composed of a wiper switch 2, a wiper motor 3, a washer motor 4 and a control unit 5, and the control unit 5 is provided with a power circuit 6, a reset circuit 7, an interface circuit 8, a microcomputer CPU, an output circuit 9, a wiper position detecting circuit 10, and an oscillation circuit 11.

The wiper switch 2 is provided with a first variable resistor RA and a second variable resistor RB. The variable resistor RA is connected to No.1 terminal of the control unit 5 at one end and connected to No.3 terminal of the control unit 5 at another end thereof.

The first variable resistor RA is so designed as to change the value of resistance according to operation of a switching knob (not shown) of the wiper switch 2 by, for example, the driver and is used for switching the operation mode of the wiper apparatus into a stop mode (OFF), a low speed mode (LOW), a high speed mode (HI) and an intermittent mode (INT). The value of the first variable resistor RA is selected into 953Ω in the stop mode, 402Ω in the low speed mode, 0Ω in the high speed mode and 1910Ω in the intermittent mode, respectively.

The second variable resistor RB is connected to No.1 terminal of the control unit 5 at one end, and connected to No.2 terminal of the control unit 5 at another end thereof.

The second variable resistor RB is designed so as to change the value of resistance by operating the switching knob of the wiper switch 2, a washer mode (WASH) is selected at the time of changing the value of the variable resistor RB into 0Ω, furthermore the value of the second variable resistor RB is changed in seven ranks of 249Ω, 402Ω, 634Ω, 953Ω, 1370Ω, 1910Ω and 2670Ω in the intermittent mode, whereby the dwell period—or the intermittent cycle consisting of the dwell period and the wiping cycle of the wiper motor—is selected respectively to 2.5 sec., 4.8 sec., 7.1 sec., 9.4 sec., 11.7 sec., 14.0 sec. and 16.5 sec.

The power circuit 6 is a constant voltage circuit consisting of a diode D1, resistors R1, R2 and R4, zener diodes ZD1 and ZD2, capacitors C1, C2 and C3, and a transistor TR4 (NPN type), the anode of the diode D1 is connected to the power source ACC through No.9 terminal of the control unit 5 and the emitter of the transistor TR4 is connected to the power port P1 of the microcomputer CPU. The power circuit 6 has function to apply a voltage with constant potential to the power port P1 of the microcomputer CPU according to on-operation of the ignition switch (not shown).

The reset circuit 7 consists of resistors R5 and R6, a zener diode ZD3, a capacitor C4 and a transistor TR5 (PNP type). The reset circuit 7 has function to reset the microcomputer CPU in the initial state by making a reset port P2 of the microcomputer CPU in a low level for predetermined time at the time of connecting the control unit 5 to the power source ACC.

The output circuit 9 is provided with a first relay RL1, a second relay RL2, a third relay RL3, transistors TR1, TR2 and TR3, and resistors R8, R9 and R10.

In a case of selecting the washer mode, the potential level at a washer port P9 of the microcomputer CPU becomes high, the first transistor TR1 is switched on through the resistor R8 and a movable contact RL1-3 of the first relay RL1 is switched to a normal-opened contact RL1-4 from a normal-closed contact RL-2 according to excitation of a relay coil RL1-1, thereby supplying an electric current to the washer motor 4 from the power source ACC in the direction to a second brush terminal 4b from a first brush terminal 4a. The armature shaft 4c of the washer motor 4 is rotated according to the power supply from the power source ACC and washing fluid stored in a reservoir (not shown) is sprayed toward the wiping area on the wind-shield of the motor vehicle.

In a case of selecting the low speed mode, the potential level at an operation port P10 of the microcomputer CPU becomes high, the second transistor TR2 becomes to the on state and a movable contact RL2-3 of the second relay RL2 is turned to a normal-opened contact RL2-4 according to excitation of a relay coil RL2-1. Whereby, a second brush terminal 3b of the wiper motor 3 is grounded through the third relay RL3 (not excited) and an electric current is supplied to the wiper motor 3 from the power source ACC in the direction to the second brush terminal 3b from the first brush terminal 3a. An armature shaft 3d of the wiper motor 3 is rotated at a low speed according to the power supply and activates a wiper arm of the wiper apparatus at a low speed.

When the high speed mode is selected, the potential levels at the operation port P10 and a high sped port P11 become high, the second and the third transistors TR2 and TR3 become to the on states through the resistors R9 and R10 and a movable contact RL3-3 of the third relay RL3 is switched to a normal-opened contact RL3-4 from a normal-closed contact RL3-2, whereby a third brush terminal 3c of the wiper motor 3 is grounded through the second relay RL2 in the excited state and an electric current is supplied to the wiper motor 3 from the power source ACC in the direction to the third brush terminal 3c from the first brush terminal 3a. The armature shaft 3d of the wiper motor 3 is rotated at a high speed according to the power supply form the brush terminal 3a to the brush terminal 3c, thereby activating the wiper arm of the wiper apparatus at a high speed.

If the intermittent mode is selected, the operation port P10 becomes to the high potential level intermittently. When the potential level at the operation port P10 is high, the second transistor TR2 becomes to the on state through the resistor R9 and the movable contact RL2-3 of the second relay RL2 is turned to the normal-opened contact RL2-4 from the normal-closed contact RL2-2. Whereby an electric current is supplied to the wiper motor 3 and flows from the first brush terminal 3a toward the second brush terminal 3b since the relay coil RL3-1 of the third relay RL3 is not excited. Therefore the wiper motor 3 activates the wiper arm of the wiper apparatus at a low speed according to the current supply from the brush terminal 3a to the brush terminal 3b.

The second relay RL2 is linked to a position detecting switch or an auto-stop switch AS housed in the wiper motor 3 and the wiper position detecting circuit 10.

The auto-stop switch AS is provided with a movable contact AS-1 secured to the armature shaft 3a of the wiper motor 3, a normal-closed contact AS-2 connected to the power source ACC, and a grounded normal-opened contact AS-3. The auto-stop switch AS is so designed as to contact the movable contact AS-1 with the normal-opened contact AS-3 while the wiper arm is in a halfway position between the turning points on the wiping area of the windshield, but as to contact the movable contact AS-1 with the normal-closed contact AS-2 when the wiper arm arrives at the stop position, whereby the auto-stop switch AS has function to maintain the electric circuit to the wiper motor 3 until the wiper arm arrives at the stop position from the halfway position between the turning points.

During the intermittent mode, the potential level at the operation port P10 of the microcomputer CPU becomes low for a predetermined dwell period after duration of the temporary high potential state, so that the power supply to the relay coil RL2-1 of the second relay RL2 is interrupted and the movable contact RL2-3 is switched to the normal-closed contact RL2-2. In this time, if the wiper arm is in the halfway position between the turning points, the movable contact AS-1 is connected to the normal-opened contact AS-3, therefore the grounded circuit of the second brush terminal 3b of the wiper motor 3 is held through the auto-stop switch AS and the armature shaft 3d of the wiper motor 3 continues to rotate. The movable contact AS-1 of the auto-stop switch AS is tuned to the normal-closed contact AS-2 when the wiper arm arrives at the stop position, whereby the rotation of the wiper motor 3 is discontinued. The operation port P10 of the microcomputer CPU becomes to the high potential state again for a while after the predetermined dwell period elapses.

The wiper position detecting circuit 10 is composed of resistors R11, R12 and R13 and a zener diode ZD4, and connected to the movable contact AS-1 of the auto-stop switch AS through No.7 terminal of the control unit 5. The wiper position detecting circuit 10 supplies a low level signal to a wiper position check port P12 of the microcomputer CPU when the wiper arm is in the halfway position between the turning points, and supplies a high level signal to the wiper position check port P12 when the wiper arm arrives at the stop position.

The oscillation circuit 11 is composed of an oscillator OSC and capacitors C6 and C7 and supplies a clock pulse to oscillation ports P13 and P14 in order to control the microcomputer CPU.

The interface circuit 8 is composed of a reference resistor RC, a resistor R7 for discharging and a capacitor C5 for charging. A resistor with 3480Ω is chosen as the reference resistor RC and a capacitor with electrostatic capacity of 0.27 µF is chosen as the capacitor C5 in this embodiment.

Figure 2:
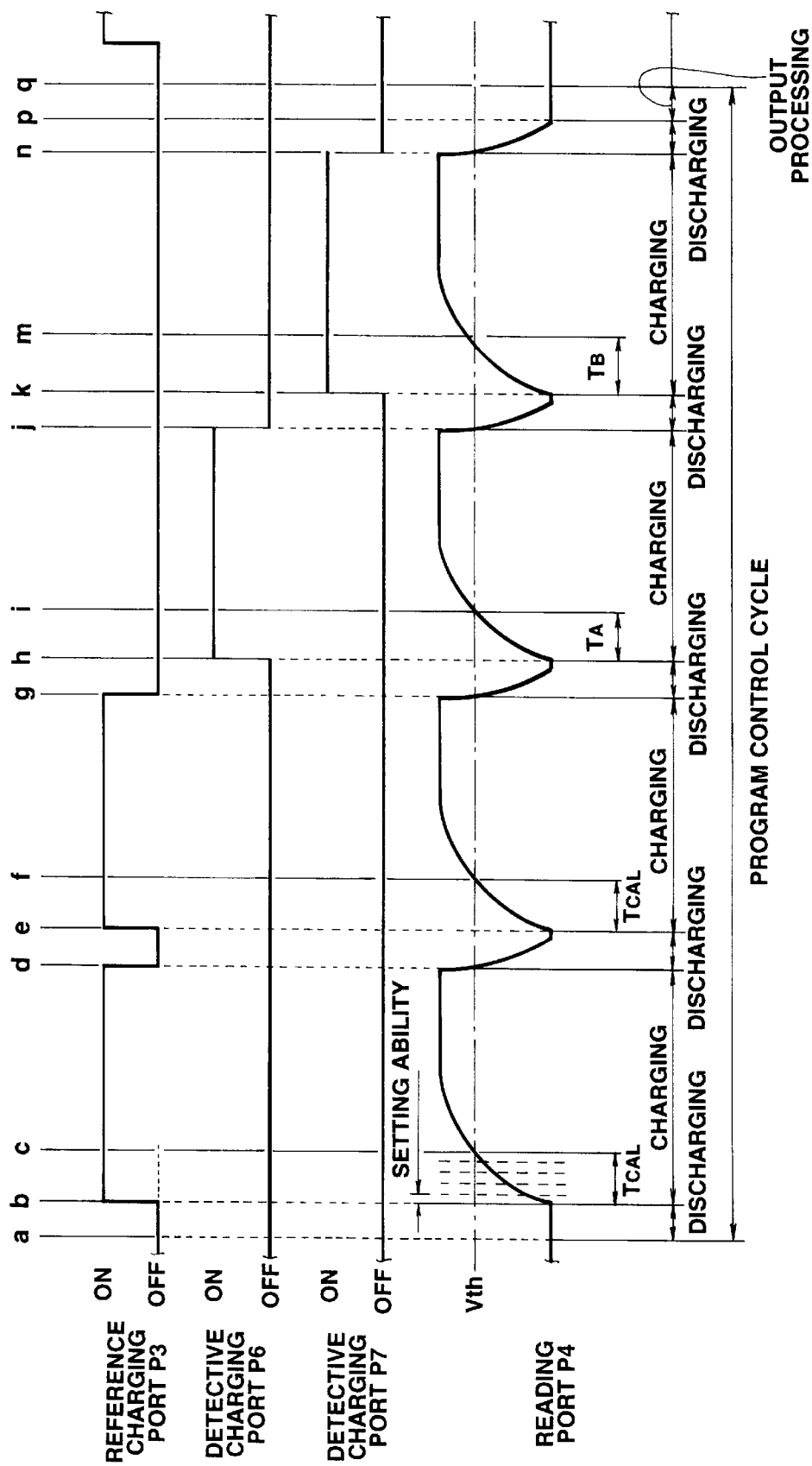
FIG. 2 is a time chart illustrating measurement of charging times of a common capacitor by repeating charging and discharging.

In the interface circuit 8, when the electric power is supplied to the microcomputer CPU from the power source ACC at time a as shown in FIG. 2, the potential level at a discharging port P5 of the microcomputer CPU becomes low and the capacitor C5 is discharged. Then, the electric potential with a predetermined potential level is generated from a reference charging port P3 at time b, whereby the capacitor C5 is charged through the reference resistor RC and charged potential of the capacitor C5 is supplied to a reading port P4 of the microcomputer CPU through the resistor R7. The reading port P4 of the microcomputer CPU does not have function as an analog-digital conversion port, therefore the microcomputer CPU reads data "1" when the electric potential at the reading port P4 exceeds a threshold level Vth and reads data "0" when the aforementioned potential does not exceed the threshold level Vth. Namely, the data obtained from the reading port P4 of the microcomputer CPU becomes to "1" at time c when the electric potential at the reading port P4 exceeds the threshold level Vth and the microcomputer reads charging time $T_{CAL}$, that is reference charging time required for charging the capacitor C5 through a charging circuit including the reference resistor RC.

The potential levels at the reference charging port P3 and the discharging port P5 of the microcomputer CPU become low at time d shown in FIG. 2, therefore the capacitor C5 is discharged until time e.

The electric potential with the predetermined level is generated again from the charging port P3 of the microcomputer CPU at time e, whereby the capacitor C5 in the discharged state is charged again through the reference resistor RC and the charged potential of the capacitor C5 is supplied to the reading port P4 through the resistor R7. The data of "1" is obtained from the reading port P4 at time f when the electric potential at the reading port P4 exceeds the threshold level Vth and the microcomputer CPU reads the reference charging time $T_{CAL}$ again.

At time g after the time f shown in FIG. 2, the potential levels at the reference charging port P3 and the discharging port P5 of the microcomputer CPU become low, thereby discharging the capacitor C5 until time h. In such a manner, the reading of the reference charging time $T_{CAL}$ required for charging the capacitor C5 from the reference charging port P3 through the reference resistor RC is executed twice.

Subsequently, the electric potential with the predetermined level is generated from a charging port P6 (first detective charging port) of the microcomputer PCU at time h, so that the capacitor C5 in the discharged state is charged through the first variable resistor RA disposed in the wiper switch 2 and the charged potential of the capacitor C5 is supplied to the reading port P4 of the microcomputer CPU through the resistor R7. The data "1" is obtained from the reading port P4 at time i when the charged potential of the capacitor C5 exceeds the threshold level Vth and the microcomputer CPU reads charging time TA, that is first detective charging time required for charging the capacitor C5 through another charging circuit including the variable resistor RA of the wiper switch 2.

At time j shown in FIG. 2, the potential levels at the first detective charging port P6 and the discharging port P5 of the microcomputer CPU become low and the capacitor C5 is discharged until time k.

At time k shown in FIG. 2, the electric potential with the predetermined level is generated from a charging port P7 (second detective charging port) of the microcomputer CPU, whereby the capacitor C5 in the discharged state is charged through the second variable resistor RB of the wiper switch 2 and the charged potential of the capacitor C5 is supplied to the reading port P4 of the microcomputer CPU through the resistor R7. The data of "1" is obtained from the reading port P4 at time m when the charged potential exceeds the threshold level Vth and the microcomputer CPU reads charging time TB, that is second detective charging time required for charging the capacitor C5 through the other charging circuit including the variable resistor RB of the wiper switch 2.

Furthermore, since the potential levels at the second detective charging port P7 and the discharging port P5 become low at time n in FIG. 2, the capacitor C5 is discharged until time P after the time n. The microcomputer CPU executes an output process according to the reference charging time $T_{CAL}$, and the detective charging time TA, TB until time q. One cycle of the program control is shown with a period from time a to time q shown in FIG. 2.

The microcomputer CPU obtains relative value XA by dividing the defective charging time TA through the first variable resistor RA by the reference charging time $T_{CAL}$ after multiplying by constant K in order to simplify the treatment of numeric data and similarly obtains relative value XB by dividing the detective charging time TB through the second variable resistor RB by the reference charging time $T_{CAL}$ after multiplying by the constant K.

The respective charging times $T_{CAL}$, TA and TB are expressed as follows:

$T_{CAL} = -C \cdot (R_{RC} + R_{ON}) \cdot \ln(1 - Vth/Vcc)$ $TA = -C \cdot (R_{RA} + R_{ON}) \cdot \ln(1 - Vth/Vcc)$ $TB = -C \cdot (R_{RA} + R_{ON}) \cdot \ln(1 - Vth/Vcc)$ wherein C: electrostatic capacity of the capacitor C5 (0.27 µF)

$R_{ON}$: output resistance of the respective charge ports P3, P6 and P7 (100 Ω)

$R_{RC}$: value of the reference resistor RC (3480Ω)

$R_{RA}$: value of the first variable resistor RA (1910Ω, 953Ω, 402Ω and 0Ω)

$R_{RB}$: value of the second variable resistor RB (2670Ω, 1910Ω, 1370Ω, 953Ω, 634Ω, 402Ω249Ω and 0Ω)

V cc: 5 V, Vth: 3.5 V

Accordingly, the reference charging time $T_{CAL}$ required for charging the capacitor C5 up to the predetermined electric potential (threshold level Vth: 3.5 V ) from the reference charging port P1 through the reference resistor RC is calculated to 1164 µsec. The time of 1164 µsec is counted by a soft counter and recognized by the microcomputer CPU as 89 of recognition value. Namely, the recognition value indicates the charging time counted with setting ability of the soft counter and is obtained by dividing the charging time (1164 µsec) by the machine cycle (13 µsec). Although it is possible to improve accuracy of the soft timer by shortening the machine cycle, the machine cycle should be determined considering balance between the charging time and the memory of the microcomputer CPU.

The first detective charging time TA corresponding to the intermittent mode (INT), the stop mode (OFF), the low speed mode (LOW) and the high speed mode (HI) of the wiper apparatus selected by switching over the first variable resistor RA into 1910Ω, 953Ω, 402Ω and 0Ω respectively is shown in Table 1. The detective charging time TA is read as 653 μsec, 342 μsec, 163 μsec and 33 μsec from Table 1, and the recognition value of the charging time TA by the microcomputer CPU is shown as 50, 26, 12 and 2, respectively.

TABLE 1

| | | | | |
|---|---|---|---|---|
| Detective charging time TA (sec) | 0.000653 | 0.000342 | 0.000163 | 0.000033 |
| Recognition value of TA | 50 | 26 | 12 | 2 |
| Relative value XA | 143 | 74 | 34 | 5 |
| Threshold value | | 109 | 54 | 20 |
| Threshold value converted into resistance value (Ω) | | 1455 | 660 | 200 |
| Operation mode | INT | OFF | LOW | HI |
| Resistance value of variable resistor RA (Ω) | 1910 | 953 | 402 | 0 |

The second detective charging time TB corresponding to the dwell periods of 16.5 sec, 14.0 sec, 11.7 sec, 9.4 sec, 7.1 sec, 4.8 sec and 2.5 sec, and the washer mode (WASH) of the wiper apparatus selected by switching over the second variable resistor RB into 2670Ω, 1910Ω, 1370Ω, 953Ω, 634Ω, 402Ω, 24Ω and 0Ω respectively is shown in Table 2. The detective charging time TB is read from the Table 2 as 900 μsec, 653 μsec, 478 μsec, 642 μsec, 239 μsec, 163 μsec, 113 μsec and 33 μsec, respectively. The recognition value of the charging time TB by the microcomputer CPU is shown as 69, 50, 36, 26, 18, 12, 8 and 2.

The relative values XA and XB shown in Table 1 and Table 2 are obtained according to the following equations;

$$XA = K \cdot (\text{recognition value of } TA)/(\text{recognition value of } T_{CAL})$$

$$XB = K \cdot (\text{recognition value of } TB)/(\text{recognition value of } T_{CAL})$$

wherein K is a constant used for simplifying the treatment of numeric data and is 255 in this embodiment.

The relative values XA and XB are not influenced by the capacity of the capacitor C5 and the power source voltage as mentioned above.

The threshold value shown in Table 1 and Table 2 are numerical values selected for determining the operation mode of the wiper apparatus in accordance with the relative value. The threshold values are defined to intermediate value between the relative values of the respective operation modes.

The microcomputer CPU executes a determination process by comparing the detective charging time TA required for charging the capacitor C5 through the first variable resistor RA with the data table shown in Table 1, Namely, when the relative value XA calculated from the first detective charging time TA and the reference charging time $T_{CAL}$ is larger than threshold value 54 but not larger than threshold value 109, the microcomputer CPU determines the operation mode to be the stop mode. The microcomputer CPU determines the operation mode of the wiper apparatus to be the low speed mode when the relative value XA is larger than threshold value 20 but not larger than the threshold value 54. Furthermore, the microcomputer CPU determines the operation mode to be the intermittent mode when the relative value XA exceeds the threshold value 109, and determines the operation mode of the wiper apparatus to be the high speed mode when the relative value XA does not exceed the threshold value 20.

The microcomputer CPU further executes the determination process by comparing the detective charging time TB

TABLE 2

| | | | | | | | | |
|---|---|---|---|---|---|---|---|---|
| Detective charging time TB (sec) | 0.000900 | 0.000653 | 0.000478 | 0.000342 | 0.000239 | 0.000163 | 0.000113 | 0.000033 |
| Recognition value of TB | 69 | 50 | 36 | 26 | 18 | 12 | 8 | 2 |
| Relative value XB | 197 | 143 | 103 | 74 | 51 | 34 | 22 | 5 |
| Threshold value | | 170 | 123 | 89 | 63 | 43 | 28 | 14 |
| Threshold value converted into resistance value (Ω) | | 2300 | 1620 | 1170 | 800 | 535 | 330 | 125 |
| Operation mode | 16.5 s | 14.0 s | 11.7 s | 9.4 s | 7.1 s | 4.8 s | 2.5 s | WASH |
| Resistance value of variable resistor RB (Ω) | 2670 | 1910 | 1370 | 953 | 634 | 402 | 2 49 | 0 |

Detective charging times TA and TB are functions of electrostatic capacity of the capacitor C5, so that the charging time and the recognition value are fluctuated by variation of the electrostatic capacity of the capacitor C5 according to, for example, temperature change or so. The recognition value changes also by initial dispersion of the capacity of the capacitor C5. Furthermore, the charging times TA and TB are also functions of voltage applied to the capacitor C5, and the recognition value by the microcomputer CPU are fluctuated by variation of the power source voltage.

Similarly, the reference charging time $T_{CAL}$ is a function of the electrostatic capacity of the capacitor C5 and the voltage applied to the capacitor C5, therefore it is possible to eliminate the effect of the capacity of the capacitor C5 and the power source voltage by introducing ratios of the detective charging times TA and TB to the reference charging time $T_{CAL}$.

required for charging the capacitor C5 through the second variable resistor RB with the data table shown in Table 2. Namely, the microcomputer CPU determines the operation mode of the wiper apparatus to be the washer mode when the relative value XB calculated from the second detective charging time TB and reference charging time $T_{CAL}$ does not exceed threshold value 14, and the microcomputer CPU determines the dwell period to be 2.5 seconds when the relative value XB is larger than the threshold value 14 but not larger than threshold value 28, determines the dwell period to be 4.8 seconds when the relative value XB is larger than the threshold value 28 but not larger than threshold value 43, determines the dwell period to be 7.1 seconds when the relative value XB is larger than the threshold value 43 but not larger than threshold value 63, determines the dwell period to be 9.4 seconds when the relative value XB is larger than the threshold value 63 but not larger than threshold value 89, determines the dwell period to be 11.7 seconds when the relative value XB is larger than the threshold value 89 but not larger than threshold value 123, determines the dwell period to be 14.0 seconds when the relative value XB is larger than the threshold value 123 but not larger than threshold value 170, and determines the dwell period to be 16.5 seconds when the relative value XB exceeds the threshold value 170.

Figure 3:
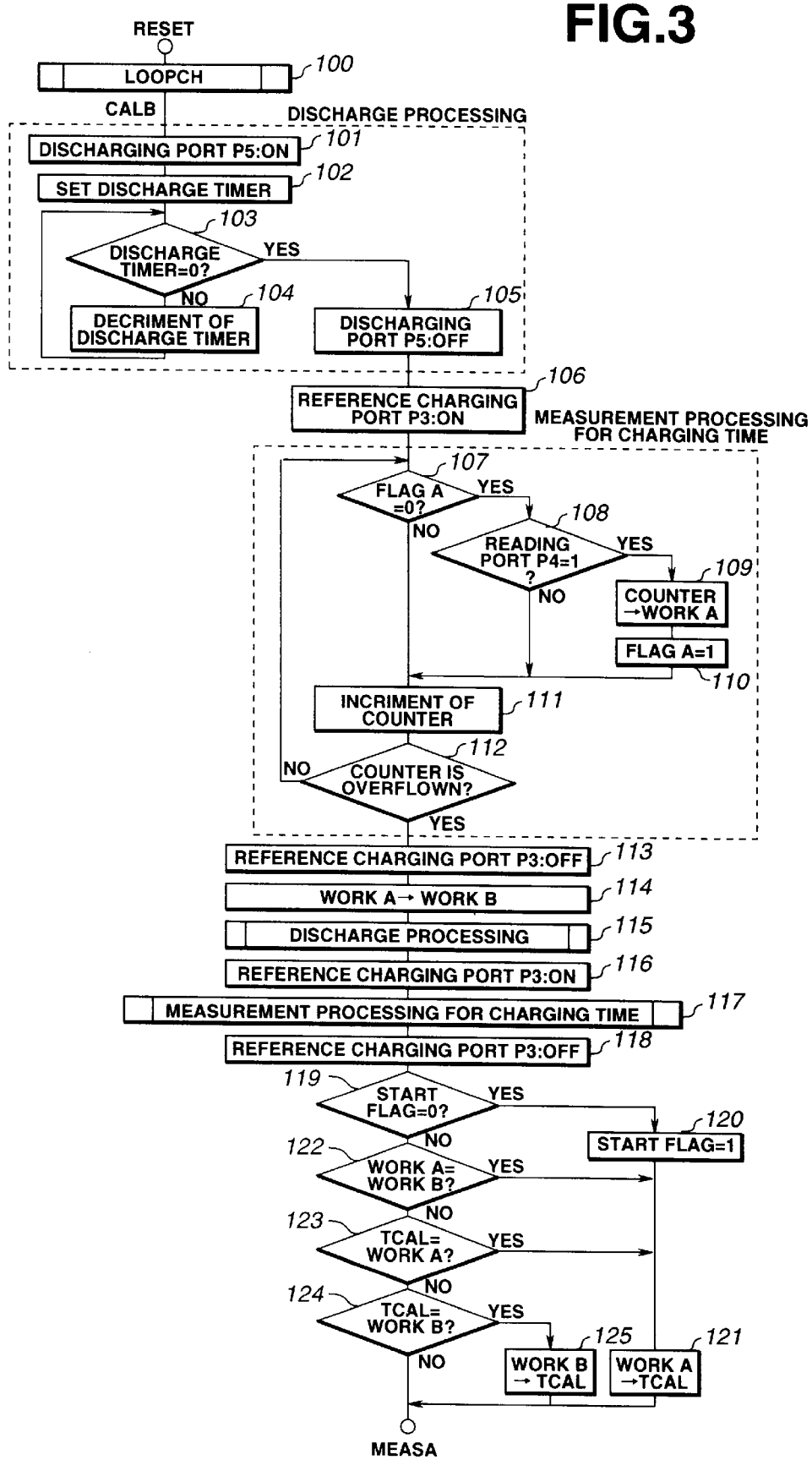
FIG. 3 is a flow chart illustrating a routine for measurement of reference charging time.
Figure 4:
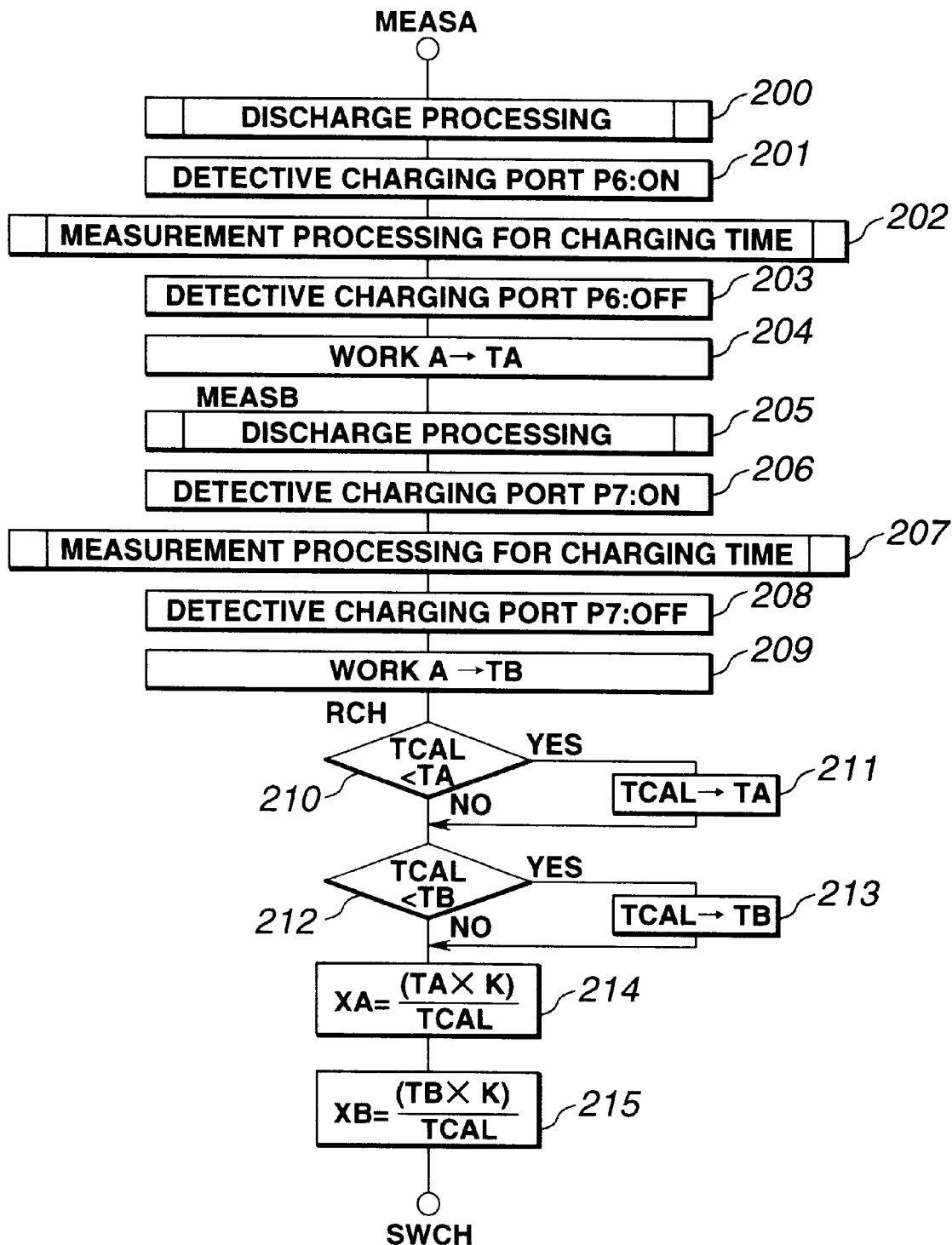
FIG. 4 is a flow chart illustrating a routine for measurement of detective charging time and for calculation of relative value.
Figure 5:
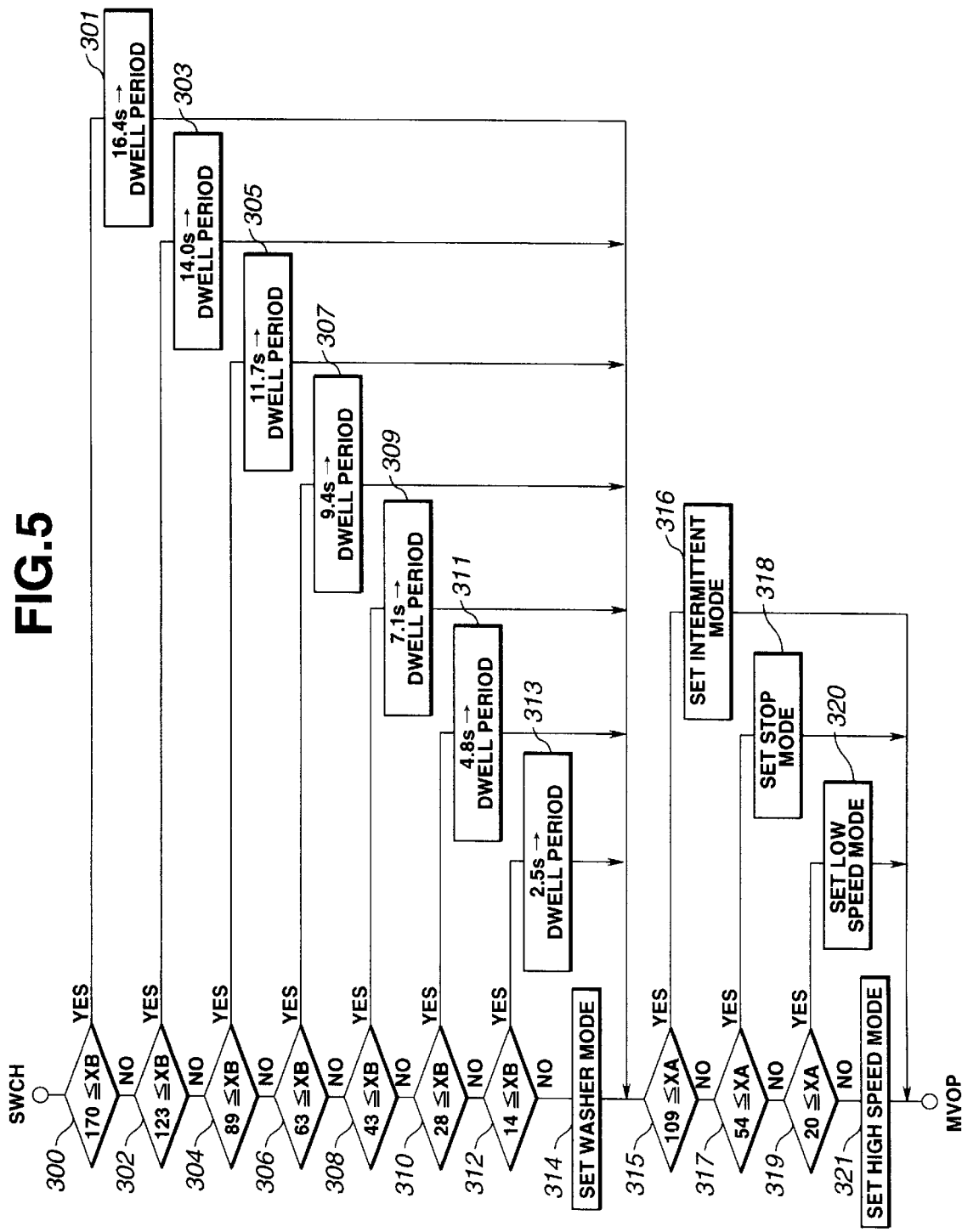
FIGS. 5 and 6 are flow charts illustrating a routine for setting up the operation mode of the wiper apparatus.
Figure 6:
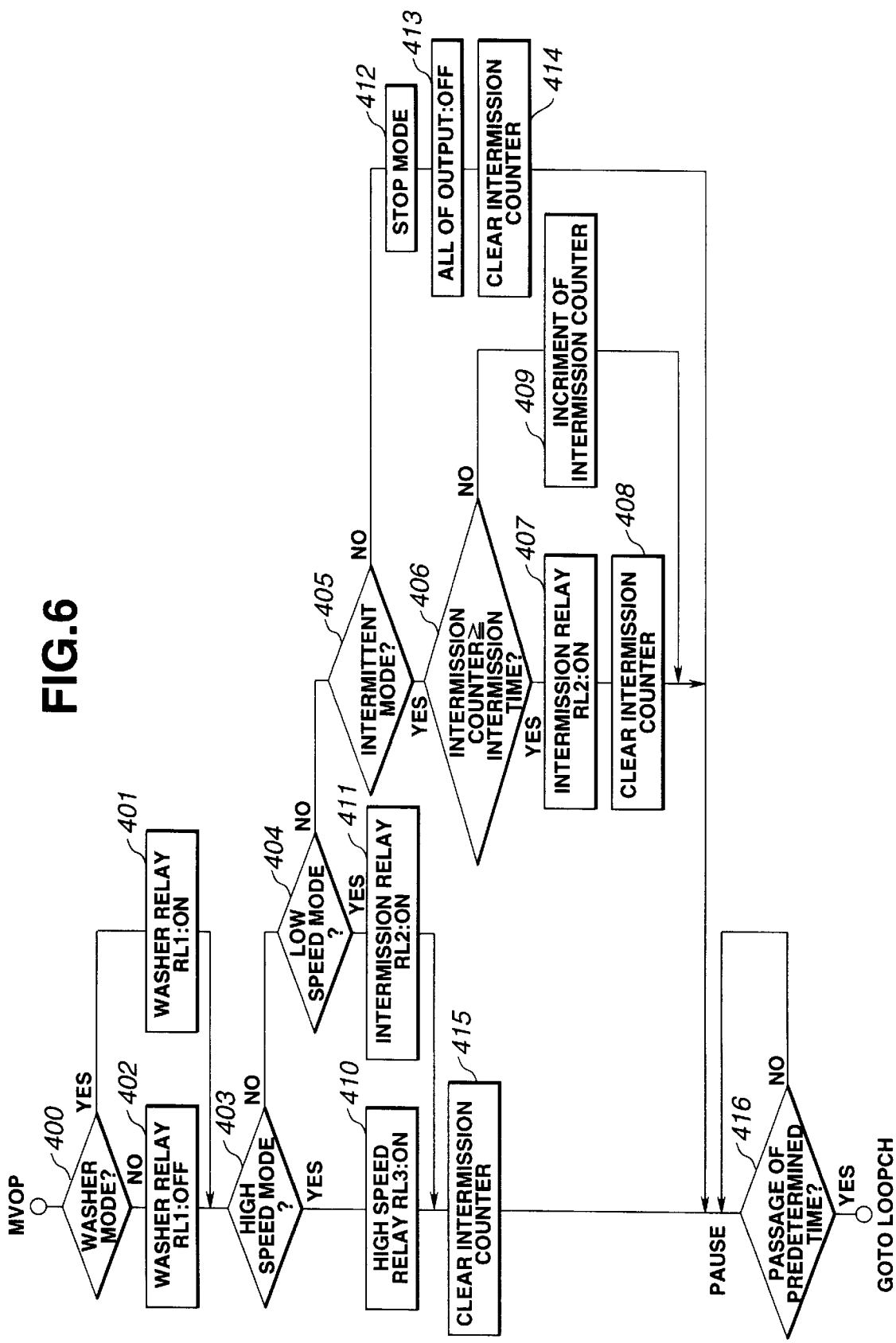

The microcomputer CPU executes the control on basis of the time chart shown in FIG. 2, and the flow charts shown in FIGS. 3 to 6. A routine for measurement of the reference charging time $T_{CAL}$ is shown in FIG. 3, a routine for measurement of the detective charging times TA, TB through the first and second variable resistors RA, RB and calculation of the relative values XA, XB is shown in FIG. 4, and a routine for setting up of the operation mode of the wiper apparatus is shown in FIG. 5 and FIG. 6.

When the voltage with constant electric potential is applied to the microcomputer CPU from the power circuit 6, the microcomputer CPU is set into on initial state through the reset circuit 7, executes setting of register port and roop initialization of the program in a step 100 of the measurement routine for the reference charging time shown in FIG. 3, furthermore performs discharge processing as preparation for charging processing at steps 101 to 105. In this time, the discharging port P5 is made into a low level state at step 101, thereby starting discharge of the capacitor C5 (at time a shown in FIG. 2), subsequently discharge timer starts at step 102 and the steps 104 and 103 are executed repeatedly until the discharge timer completes the time counting (discharge timer=0). When the discharge timer completes the counting and the capacitor C5 is discharged completely, control proceeds to step 105 and the discharging port P5 becomes to a floating state from the low level state, then control proceeds to step 106.

In the step 106, the electric potential in the predetermined level is generated at the reference charging port P3, whereby charging of the capacitor C5 is started through the reference resistor RC at time b shown in FIG. 2, and measurement processing for the reference charging time are performed through steps 107 to 112.

In the measurement processing for the charging time, it is decided whether flag A is set or not at step 107 first of all. The flag A is not set in this time, and decision is done as to whether the data "1" is inputted or not from the reading port P4 of the microcomputer CPU, namely whether or not the potential level at the reading port P4 exceeds the threshold level Vth at step 108. At this time, the potential level at the reading port P4 does not yet reach the threshold level Vth, therefore control proceeds to step 111 and increment of a time counter is performed at the step 111. It is decided whether the counter is overflown or not at step 112 and control returns to the step 107 since the counter is not yet overflown in this stage. In such a manner, the steps 107, 108, 111 and 112 are repeated until the potential level at the reading port P4 exceeds the threshold level Vth and data "1" is inputted into the reading port P4.

When the potential level at the reading port P4 exceeds the threshold level Vth at time c shown in FIG. 2, control proceeds to step 109 from the step 108 and the present value of the time counter that is time data of a period ranging from time b to time c shown in FIG. 2, is stored in a memory area A in the microcomputer CPU as data of the reference charging time at the step 109. Control proceeds to the step 111 after setting the flag A at step 110 and returns to the step 107 through the step 112 after the increment of the counter at the step 111. Furthermore, the steps 107, 111 and 112 are executed repeadedly until the counter is overflown at time d shown in FIG. 2.

When the counter is overflown at time d shown in FIG. 2 and the first measurement of the reference charging time is completed, control proceeds to step 113 and the reference charging port P3 becomes to the off-state at the step 113. Control proceeds to step 115 after transferring the data of the first reference charging time stored in the memory area A to another memory area B in the microcomputer CPU at step 114.

At the step 115, the discharge processing is performed through the steps 101 to 105. When the discharge processing is finished at time e shown in FIG. 2, the electric potential is generated from the reference charging port P3 at step 16, thereby starting the charging of the capacitor C5 through the reference resistor RC, control proceeds to step 117 and the measurement processing of the reference charge time in the second time are carried out similarly through the aforementioned steps 107 to 112, whereby time data of a period ranging from time e to time f shown in FIG. 2 are stored in the memory area A in the microcomputer CPU as second data of the reference charging time.

When the counter is overflown and the second measurement of the reference charging time is completed at time g shown in FIG. 2, the reference charging port P3 becomes to the off-state at step 118 and then control proceeds to step 119.

In the step 119, it is decided whether START flag is set or not in order to recognize reference charging time $T_{CAL}$ is stored or not. The START flag is not set in the first time of the control cycle and control proceeds to step 120 form the step 119. Control further proceeds to step 121 after setting the START flag at the step 120, and the second data of the reference charging time in the memory area A of the microcomputer CPU is stored as the reference charging time $T_{CAL}$ at the step 121. After the second time of the control cycle, control proceeds to step 122 from the step 119 since the START flag is already set at the decision of step 119.

In the step 122 after the decision that the START flag is set, it is decided whether the first data of the reference charging time stored in the memory area B and the second data of the reference charging time stored in the memory area A has the same value or not, and control proceeds to the step 121 when the first data in the memory area B is equal to the second data in the memory area A. If the first data is not equal to the second data, decision is done as to whether the second data of the reference charging time is stored or not as the reference charging time $T_{CAL}$ at step 123 and control proceeds to the step 121 when the second data of the reference charging time is stored as the reference charging time $T_{CAL}$. Further, if the second data is not stored as the reference charging time $T_{CAL}$, control proceeds to step 124 and it is decided whether the first data of the reference charging time is stored or not as the reference charging time $T_{CAL}$. When the first data of the reference charging time is stored as the reference charging time $T_{CAL}$, control proceeds to step 125 and the first data of the reference charging time in the memory area B is stored as the reference charging time $T_{CAL}$.

In the measurement routine for the reference charge time shown in FIG. 3, the data of the reference charge time required for charging the capacitor C5 through the reference resistor RC without using the variable resistors RA and RB of the wiper switch 2 are obtained. The reference charge time data obtained in this routine are used in the calculation routine of the relative value as described later.

Control proceeds to the measurement routine for the detective charge time shown in FIG. 4 after the measurement routine for the reference charge time shown in FIG. 3. First of all, the discharge processing is performed at step 200 similarly to the steps 101 to 105 shown in FIG. 3 from time g to time h shown in FIG. 2. When the discharge processing is completed, the electric potential in the predetermined level is generated at the first detective charging port P6 at step 201, whereby the capacitor C5 is started to be charged through the first variable resistor RA in the wiper switch 2 at time h shown in FIG. 2, and measurement processing for the first detective charging time is performed at step 202 similarly through the steps 107 to 112. Therefore, time data of a period ranging from time h to time i shown in FIG. 2 are transferred into the memory area A in the microcomputer CPU as data of the first detective charging time.

When the measurement of the first detective charging time is finished at time j shown in FIG. 2, the detective charging port P6 becomes to the off-state at step 203 and control proceeds to step 204. In the step 204, the data of the first detective charging time in the memory area A is stored in the microcomputer CPU as TA. Namely, the data of the time required for charging the capacitor C5 through the first variable resistor RA in the wiper switch 2 is obtained as numeric value TA by making the detective charging port P6 into the on-state.

At step 205, the discharge processing is exececuted similarly through the steps 101 to 105 and the electric potential in the predetermined level is generated at the second detective charging port P7 in step 206, whereby the capacitor C5 is started to be charged through the second variable resistor RB in the wiper switch 2 at time k shown in FIG. 2 and measurement processing for the second detective charging time is carried out at step 207 similarly through the steps 107 to 112 as shown in FIG. 3. In the measurement processing, the value of the counter at the time when the potential level at the reading port P4 exceeds the threshold level Vth at time m shown in FIG. 2 is transferred into the memory area A in the microcomputer as data of the second detective charging time.

When the measurement of the second detective charging time is finished at time n shown in FIG. 2, the detective charging port P7 becomes to the off-state at step 208 and the data of the second detective charging time in the memory area A is stored in the microcomputer CPU as TB at step 209. Namely, the data of the time required for charging the capacitor C5 up to the threshold level Vth through the second variable resistor RB in the wiper switch 2 is obtained as numeric value TB by making the detective charging port P7 into the on-state.

After completing the measurement processing of the first and second detective charging times TA and TB, control proceeds to the calculation routine of relative value consisting of steps 214 and 215 after performing the processing of steps 210 to 213. In the steps 214 and 215, the relative value XA is obtained from the detective charging time TA and the reference charging time $T_{CAL}$, and the relative value XB is obtained from the detecting charging time TB and the reference charging time $T_{CAL}$. Control proceeds to the setting routine for the operation mode at time P, and the operation mode of the wiper apparatus is set up until time q after the time p shown in FIG. 2 using the relative values XA and XB. The processing of the steps 210 to 213 is performed in order to prevent the relative values XA and XB from overflowing.

In the routine for setting up the operation mode shown in FIG. 5 and FIG. 6, the relative value XA is used for selecting the intermittent mode, the stop mode, the low speed mode and the high speed mode, and the relative value XB is used for selecting the washer mode and the dwell periods in the intermittent mode. In the control program, processing is carried out by using the relative values XB in the first place.

For example, if the driver selects the dwell period of 16.5 seconds in the intermittent mode by operating the wiper switch 2, the second variable resistor RB is switched to 2670Ω and the detective charging time TB of 0.000900 seconds is obtained, therefore the recognition value of TB is 69 and the relative value XB is 196 as shown in Table 2. Accordingly, control proceeds to step 301 from step 300 since the relative value XB is not less than the threshold value 170, and the dwell period is set into 16.4 seconds at the step 301.

In the same manner, if the detective charging time TB of 0.000653 seconds is obtained, the recognition value of TB is 50 and the relative value XB of 143 is calculated as shown in Table 2, therefore control proceeds to step 303 through the step 300 and step 302 and the dwell period is set into 14.0 seconds because the relative value XB is less than the threshold value 170 but not less than the threshold value 123.

If the detective charging time TB of 0.000478 seconds is measured, the recognition value of TB is 36 and the relative value XB is 103 as shown in Table 2, therefore control proceeds to step 305 through the steps 300, 302 and step 304 because the relative value XB is less than the threshold value 123 but not less than the threshold value 89, and the dwell period is set into 11.7 seconds at the step 305.

If the detective charging time TB is 0.000342 seconds, the recognition value of TB is 26 and the relative value XB of 74 is calculated as shown in Table 2, accordingly control proceeds to step 307 through the steps 300, 302, 304 and step 306 since the relative value XB is less than the threshold value 89 but not less than threshold value 63, and the dwell period is set 9.4 seconds at the step 307.

In this manner, if the detective charging time TB of 0.000239, 0.000163 or 0.000113 seconds is measured, the recognition value of TB of 18, 12 or 8 and the relative value XB of 51, 34 or 22 are obtained, respectively as shown in Table 2, therefore control proceeds to step 309, 311 or 313 through step 308, 310 or 312, and the dwell period is set into 7.1 4.8 or 2.5 seconds, respectively.

When the driver selects the washer mode by operating the wiper switch 2, the second variable resistor RB in the wiper switch 2 is switched to 0Ω and the detective charging time TB of 0.000033 seconds is measured, accordingly the recognition value of TB is 2 and relative value XB is 5 as shown in Table 2. Therefore control proceeds to step 314 through the steps 300, 302, 304, 306, 308, 310 and 312 since the relative value XB is less than 14, and the washer mode is set at the step 314.

When the selection processing by the relative value XB is completed, control proceeds to step 315 and the selection of the operation mode by the relative value XA is started.

When the driver selects the intermittent mode among the operation modes of the wiper apparatus by operating the wiper switch 2, the first variable resistor RA is switched to 1910Ω and the detective charging time TA of 0.000653 seconds is measured, therefore the recognition value of TA is 50 and the relative value XA is 143 as shown Table 1. Accordingly, control proceeds to step 316 through the step 315 since the relative value XA is not less than threshold value 109 and the intermission mode is set at the step 316. Then control proceeds to step 400 shown in FIG. 6.

In a case where the dwell period has been set at any one of the steps 301, 303, 305, 307, 309, 311 and 313, control proceeds to step 402 through the step 400 because the washer mode is not set at step 314, and output from the washer port P9 of the microcomputer CPU is cut off at the step 402. Furthermore, control proceeds to step 406 through steps 403, 404 and 405 since the intermittent mode is set in the present time and it is decided whether or not counter value of the intermission counter exceeds the dwell period set through the routine of the steps 300 to 313. The counter value does not reach the dwell period yet in this stage, so that control returns to the step 100 through step 416 after increment of the intermission counter at step 409, and the steps 406 and 409 are executed repeatedly until the counter value of the intermission counter reaches the dwell period.

When the counter value of the intermission counter reaches the dwell period set through the steps 300 to 313, the potential level at the operation port P10 of the microcomputer CPU becomes high temporally and the relay coil RL2-1 of the second relay (intermission relay) RL2 is excited at step 407, whereby the wiper arm is reciprocated one time by the wiper motor 3, and the intermission counter is cleared at step 408. After this, control returns to the step 100 after passage of predetermined time at the step 416. In such a manner, the operation mode of the wiper apparatus is determined to be the intermittent mode according to the value of the first variable resistor RA in the wiper switch 2 and the dwell period is determined according to the value of the second variable resistor RB in the wiper switch 2.

If the driver selects the stop mode by operating the wiper switch 2, the first variable resistor RA is switched to 953Ω and the detective charging time TA of 0.000342 seconds is measured, so that recognition value of TA and the relative value XA are obtained as 26 and 74, respectively as shown in Table 1. Therefore, control proceeds to step 318 through the step 315 and step 317 because the relative value XA is less than the threshold value 109 but not less than threshold value 54, and the stop mode is set at the step 318. Then control proceeds to the step 400.

In the case where the dwell period has been set at the step 301, 303, 305, 306, 307, 309, 311 or 313 and the washer mode has not been set at step 314, control proceeds to step 412 through the steps 403 to 405 after cutting off the output from the washer port P9 at the step 402, and all of the output power are made into off-states at step 413. Control returns to the step 100 through the step 416 after clearing the intermission counter at step 414. In such a manner, it is determined that the stop mode is selected according to the value of the first variable resistor RA in the wiper switch.

If the driver selects the low speed mode among the operation modes of the wiper apparatus by operating the wiper switch 2, the first variable resistor RA is switched to 402Ω and the detective charging time TA of 0.000163 seconds is measured, therefore the recognition value of TA and the relative value XA are obtained as 12 and 34, respectively as shown in Table 1. Accordingly, control proceeds to step 320 through the steps 315, 317 and step 319 because the relative value XA is less than the threshold value 54 but not less than threshold value 20, whereby the low speed mode is set at the step 320. Control proceeds to the step 400.

In the case where the washer mode has not been set at the step 314, control proceed to step 411 through the step 403 and 404 after cutting off the output from the washer port P9 at the step 402, the potential level at the operation port P10 of the microcomputer CPU becomes high continuously and the relay coil RL2-1 of the second relay (intermission relay) RL2 is excited at the step 411, whereby the wiper motor 3 rotates at a low speed. After this, control returns to the step 100 through the step 416 after clearing the intermission counter at step 415. In such a manner, it is determined that the low speed mode is selected on basis of the value of the first variable resistor RA in the wiper switch 2 and the wiper arm is driven reciprocatingly at a low speed by the wiper motor 3.

When the driver selects the high speed mode by operating the wiper switch 2, the first variable resistor RA is switched to 0Ω and the detective charging time TA of 0.000033 seconds is measured, so that the recognition value of TA and the relative value XA are obtained as 2 and 5, respectively as shown in Table 1. Therefore, control proceeds to step 321 through the steps 315, 317 and 319, and the high speed mode is set at the step 321 since the relative value XA is less than the threshold value 20. Then control proceeds to the step 400.

If the washer mode is not set at the step 314, control proceeds to step 410 through the step 403 after cutting off the output from the washer port P9 at the step 402, the potential level at the high speed port P11 becomes high together with the operation port P10 of the microcomputer CPU and the relay coils RL3-1 of the third relay (high speed operation relay) RL3 is excited together with the relay coil RL2-1 of the second relay RL2, whereby the wiper motor 3 rotates in a high speed. After this, control returns to the step 100 through the step 416 after clearing the intermission counter at the step 415. In such a manner, it is determined that the high speed mode is selected according to the value of the first variable resistor RA in the wiper switch 2, and the wiper arm is driven reciprocatingly at a high speed on basis of the high speed rotation of the wiper motor 3.

In a case where the driver selects the intermittent mode when the washer mode has been set at the step 314, control proceeds to step 401 through the step 400, the potential level at the washer port P9 of the microcomputer CPU becomes high and the relay coil RL1-1 of the first relay (washer relay) RL1 is excited at the step 401, whereby the washer motor 4 rotates. After this, control further proceeds to step 406 through the steps 403 to 405, therefore the wiper arm works in the intermittent mode after spraying washing fluid toward the windshield of the motor vehicle.

When the driver selects the low speed mode or the high speed mode in the state where the washer mode has been set at the step 314, control proceeds to the step 411 or the step 410 after performing the step 401. Therefore, the wiper arm works at a low or high speed after spraying the washing fluid on the wiping area of the windshield.

As mentioned above, in the wiper control device according to this invention, the microcomputer determines the selected operation mode according to the relative value calculated from the reference charging time, that is the time required for charging the capacitor through the reference resistor having predetermined resistance value in the interface circuit from the reference charging port of the microcomputer and the detective charging time, that is the time required for charging the same capacitor through the variable resistor in the wiper switch from the detective charging port of the microcomputer. Therefore, it is possible to determine the operation mode selected by the operator (driver) very acurately even if there is fluctuation in the voltage of the power source or the electrostatic capacity of the capacitor without using the microcomputer provided with analog-digital conversion function.

What is claimed is:

1. A wiper control device for controlling a wiper apparatus of a vehicle comprising;

a wiper switch having a first variable resistor and operable to select one of resistance values of said first variable resistor corresponding to respective operation modes of the wiper apparatus;

an interface circuit provided with a capacitor connected with said first variable resistor and a reference resistor connected with said capacitor; and a microcomputer including a reference charging port for supplying a first reference voltage to said capacitor through said reference resistor of said interface circuit, a first detective charging port for supplying a second reference voltage to said capacitor of said interface circuit through said first variable resistor of said wiper switch, a reading port for reading the voltage of said capacitor to be charged up to predetermined electric potential, first means for reading reference charging time required for charging said capacitor up to predetermined electric potential with the first reference voltage supplied from said reference charging port though said reference resistor of said interface circuit and detective charging time required for charging said capacitor up to predetermined electric potential with the second reference voltage supplied from said first detective charging port through said first variable resistor of said wiper switch, and second means for determining the operation mode selected by said wiper switch on basis of relative value calculated from said reference charging time and said detective charging time read by said first means.

2. A wiper control device as set forth in claim 1, wherein said wiper switch is provided with a second variable resistor, said microcomputer is provided with a second detective charging port for supplying a third reference voltage to the capacitor of the interface circuit through the second variable resistor of said wiper switch and said first means further reads detective charging time required for charging said capacitor up to predetermined electric potential with the third reference voltage supplied from said second detective charging port through said second variable resistor of said wiper switch.

3. A wiper control device as set forth in claim 2, wherein the operation mode of the wiper apparatus is selected among a stop mode, an intermittent mode, a low speed mode and a high speed mode through the first variable resistor, and a dwell period in the intermittent mode is selected through the second variable resistor.

4. A wiper control device as set forth in claim 3, wherein a washer mode of the wiper apparatus is further selectable through the second variable resistor of the wiper switch.

5. A wiper control device for controlling a wiper apparatus of a vehicle comprising;

a wiper switch having a first variable resistor and operable to select one of resistance values of said variable resistor corresponding to respective operation modes of the wiper apparatus;

an interface circuit provided with a capacitor connected with said first variable resistor, a reference resistor connected with said capacitor and a discharging resistor connected with the capacitor; and a microcomputer including a reference charging port for supplying a first reference voltage to said capacitor through said reference resistor of said interface circuit, a first detective charging port for supplying a second reference voltage to said capacitor of said interface circuit through said first variable resistor of said wiper switch, a discharging port for discharging the electric charge stored on said capacitor through said discharging resistor, a reading port for reading the voltage of said capacitor to be charged up to predetermined electric potential, first means for reading reference charging time required for charging said capacitor up to predetermined electric potential with the first reference voltage supplied form said reference charging port through said reference resistor of said interface circuit and detective charging time required for charging said capacitor up to predetermined electric potential with the second reference voltage supplied from said first detective charging port through said first variable resistor of said wiper switch, and second means for determining the operation mode selected by said wiper switch on basis of relative value calculated from said reference charging time and detective charging time read by said first means.

6. A wiper control device as set forth in claim 5, wherein said wiper switch is provided with a second variable resistor and said microcomputer is provided with a second detective charging port for supplying a third reference voltage to the capacitor of the interface circuit through the second variable resistor of said wiper switch and said first means further reads detective charging time required for charging said capacitor up to predetermined electric potential with the third reference voltage supplied form said second detective charging port through said second variable resistor of said wiper switch, wherein the operation mode of the wiper apparatus is selected among a stop mode, an intermittent mode, a low speed mode and a high speed mode through the first variable resistor, and a dwell period in the intermittent mode is selected through the second variable resistor.

7. A wiper control device as set forth in claim 6, wherein a washer mode of the wiper apparatus is further selectable through the second variable resistor of the wiper switch.

* * * * *